United States Patent [19]
Han

[11] Patent Number: 5,837,396
[45] Date of Patent: Nov. 17, 1998

[54] NEGATIVE ELECTRODE CONSTRUCTION FOR A SECONDARY BATTERY

[75] Inventor: Kyeng-Ho Han, Suwon, Rep. of Korea

[73] Assignee: Samsung Display Devices Co., Ltd., Kyunggi-do, Rep. of Korea

[21] Appl. No.: 654,373

[22] Filed: May 28, 1996

Related U.S. Application Data

[63] Continuation-in-part of Ser. No. 539,196, Oct. 4, 1995, abandoned.

[51] Int. Cl.⁶ .............................. H01M 4/72; H01M 6/10
[52] U.S. Cl. ........................... 429/94; 429/101; 429/223; 429/241
[58] Field of Search ................................ 429/94, 59, 223, 429/241, 243, 244, 209, 101; 420/900

[56] References Cited

U.S. PATENT DOCUMENTS

| | | | |
|---|---|---|---|
| 3,083,249 | 3/1963 | Belove | 429/94 |
| 4,844,999 | 7/1989 | Oshitani et al. | 429/223 |
| 5,106,700 | 4/1992 | Catotti et al. | 429/94 |
| 5,344,728 | 9/1994 | Ovshinsky et al. | 429/223 |
| 5,384,216 | 1/1995 | Teraoka et al. | 429/223 |
| 5,395,712 | 3/1995 | Furukawa | 429/206 |
| 5,527,638 | 6/1996 | Kinoshita et al. | 429/101 |

FOREIGN PATENT DOCUMENTS

| | | |
|---|---|---|
| 0419221 | 3/1991 | European Pat. Off. . |
| 0460424 | 12/1991 | European Pat. Off. . |
| 0651451 | 5/1995 | European Pat. Off. . |

*Primary Examiner*—Anthony Skapars
*Attorney, Agent, or Firm*—Christie, Parker & Hale, LLP

[57] ABSTRACT

A secondary battery has a cylindrically wound laminate made up of a positive electrode plate, a negative electrode plate, and a separator plate interposed therebetween. The wound laminate is enclosed within a protective can, which also encloses a volume of electrolyte. The negative electrode plate includes a support member, an electrolytically active substance disposed on at least one surface of the support member, and a supplementary support embedded in the electrolytically active substance. The supplementary support is in the form of an electrically conductive network formed from a plurality of entangled and interconnected conductive members, and is used to improve the electrical conductivity of negative electrode.

9 Claims, 4 Drawing Sheets

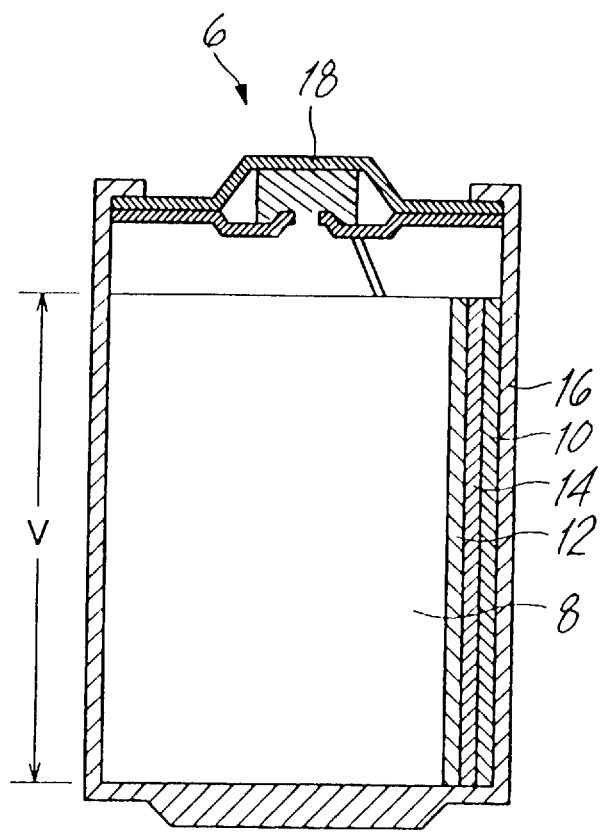

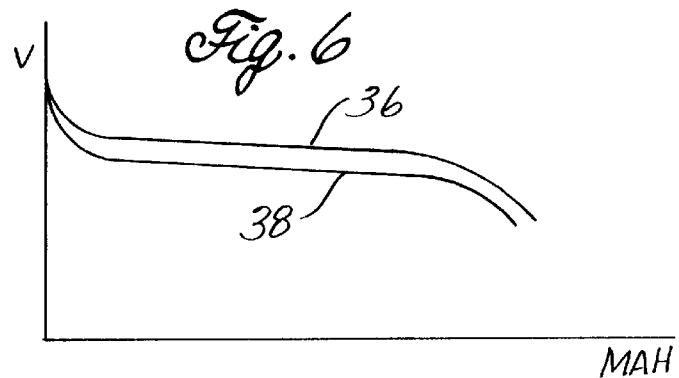
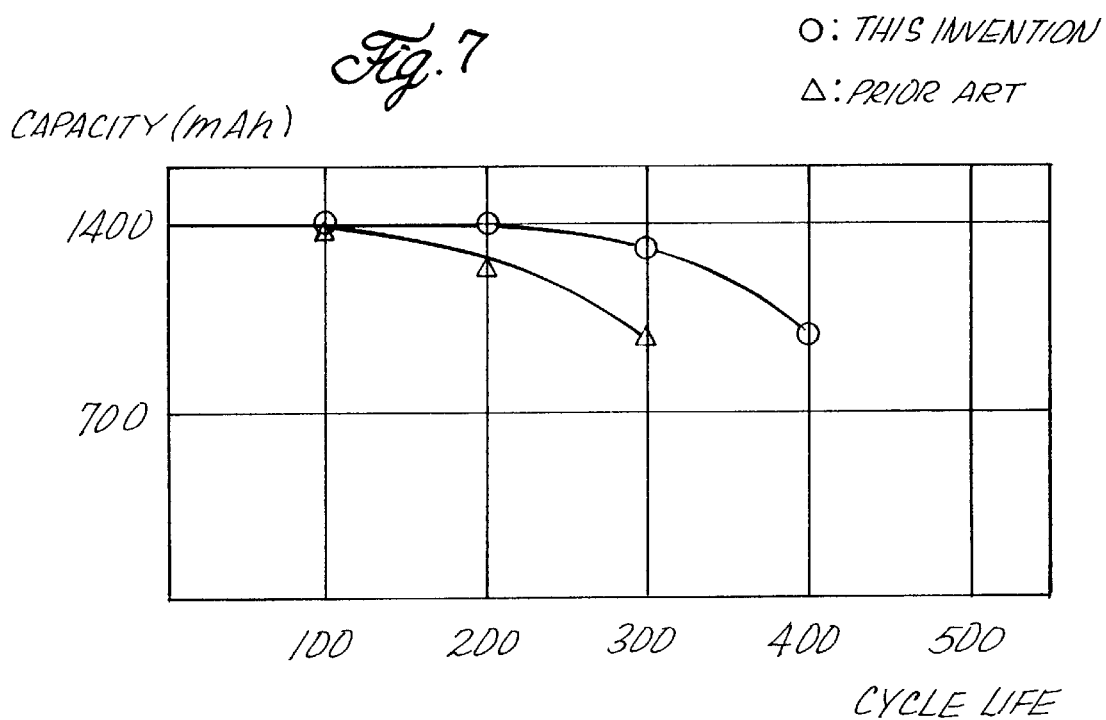

NEGATIVE ELECTRODE CONSTRUCTION FOR A SECONDARY BATTERY

RELATION TO COPENDING PATENT APPLICATIONS

This patent application is a continuation-in-part of U.S. patent application Ser. No. 08/539,196 filed on Oct. 4, 1995, now abandoned.

FIELD OF THE INVENTION

The present invention relates to nickel metal hydride secondary batteries having a cylindrically wound laminate construction comprising a positive electrode plate, a negative electrode plate, and a separator plate interposed therebetween and, more particularly, to the construction of negative electrodes for such batteries.

BACKGROUND OF THE INVENTION

The nickel-cadmium batteries are mainly used as a secondary battery. However, these batteries are both known to a small storage capacity, and the use of cadmium carries with it the potential for serious environmental pollution. Secondary batteries formed from nickel metal hydride are preferred over such cadmium secondary batteries because they display an improved storage capacity of up to 30 to 50 percent over cadmium secondary batteries, and because they do not pose a risk of environmental pollution.

Conventional nickel metal hydride batteries have a metal oxide as the positive electrode and a hydrogen retaining alloy as the negative electrode, and have a high output density. The hydrogen retaining alloy absorbs the hydrogen generated during the charging process of the battery to discharge it into the electrolyte.

Generally, nickel metal hydride batteries are constructed having a cylindrically wound laminate comprising a positive electrode plate, a negative electrode plate, and a separator plate interposed therebetween. The cylindrically wound laminate is enclosed by a protective can, which also encloses the battery electrolyte. In such nickel metal hydride secondary batteries the negative electrode requires a support means for both supporting an electrolytically active substance such as $Ni(OH)_2$, and for serving as an electricity collector. The support means is typically formed from Ni-foam, Ni-fibre, perforated metal and the like.

FIGS. 1A and 1B illustrate the structure of the negative electrode 1 of a conventional alkaline secondary battery. The negative electrode 1 comprises a support member 2 comprising a perforated steel plate coated with nickel (perforations in the plate being indicated as 3). A slurry of an electrolytically active substance 4 is applied to both surfaces of the support means. When Ni-foam or Ni-fibre is employed as the support means, having a three dimensional structure, there is no problem in the electrical conductivity. But, when a perforated metal plate is used, the electrical conductivity is considerably lower in the outer electrolytically active substance 4 than in the central support means 2. Further, when using a support means constructed from a perforated plate, the electrolytically active substance 4 may easily detach therefrom during recharging and discharging process.

When the electrode structure is installed in the protective can without welding by tabs, the active substance loses a considerable amount of its electrical conductivity due to its oxidation and dues to the binder and additive contained in the electrode. In this type of construction it is, therefore, common for the active substance to detached from the support means during the fabrication.

It is, therefore, desirable that a secondary battery be constructed in a manner that prevents the electrolytically active substance from being detached from the support means. It is desirable that the secondary battery construction provide a means for increasing the electrical conductivity of the negative electrode of the battery. It is also desirable that the secondary battery be constructed to provide a means for improving the strength of the electrode structure of the battery.

SUMMARY OF THE INVENTION

A nickel metal hydride secondary battery is constructed, according to principles of this invention, having a cylindrically wound laminate comprising a positive electrode plate, a negative electrode plate and a separator plate interposed therebetween. The cylindrically wound laminate is enclosed in a protective can that also encloses an electrolyte. The negative electrode plate comprises support member, in the form of a perforated steel plate, and an electrolytically active substance disposed on both sides of the support member. A supplementary support, having the form of an electrically conductive network, is embedded in the active substance layer of one side of the support plate just beneath the active substance layer. The supplementary support improves the electrically conductivity of the electrically active substance.

According to another embodiment of the present invention, there is provided a method for fabricating the negative electrode of an alkaline nickel metal hydride secondary battery described above. The secondary battery is formed by forming a support member coated with nickel, preparing a slurry of electrolytically active substance, applying the slurry to both side surfaces of the support member, embedding a supplementary support having the form of an electrically conductive network into the active substance layer of one side of the support member just beneath its surface, and drying the active substance layers applied to both surfaces of the support member.

The present invention will now be described more specifically with reference to the drawings attached only by way of example.

BRIEF DESCRIPTION OF THE DRAWINGS

FIG. 2 is a schematic cross-sectional side view of the secondary battery constructed according to principles of this invention.

FIG. 6 is a characteristic curve for illustrating the discharging of a nickel metal hydride secondary battery constructed according to principles of this invention; and FIG. 7 is a graph comparing discharge rates for secondary batteries constructed according to principles of this invention, and for conventional secondary batteries.

DETAILED DESCRIPTION OF THE PREFERRED EMBODIMENTS

Figure 1A:
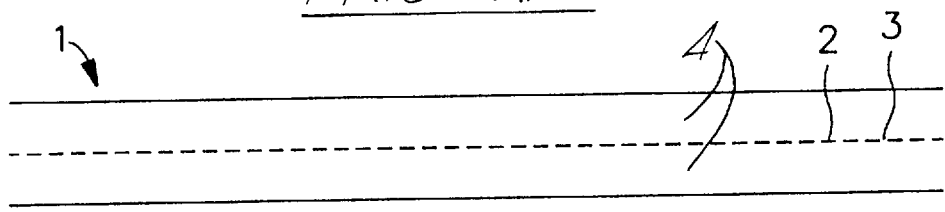
FIGS. 1A and 1B are cross-sectional side views of a negative electrode from a conventional alkaline secondary battery.
Figure 1B:
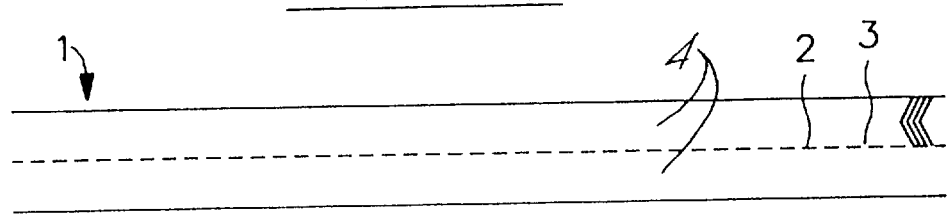

Referring to FIG. 2, a nickel metal hydride secondary battery 6, constructed according to principles of this invention, comprises a cylindrically wound laminate 8. The cylindrically wound laminate comprises a positive electrode plate 10, a negative electrode plate 12, and a separator means 14 interposed therebetween. The cylindrically wound laminate 8 is enclosed in a protective can 16 that contains a volume (V) of liquid electrolyte. A cap assembly 18 covers the upper end of the can 16.

Figure 3:
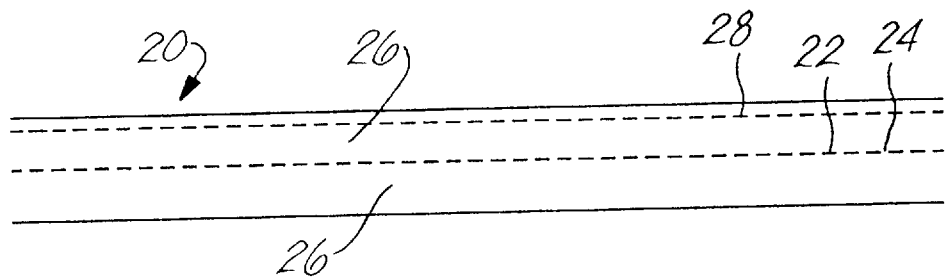
FIG. 3 is a cross-sectional side view of a negative electrode of a nickel metal hydride secondary battery constructed according to principles of this invention.

Referring to FIG. 3, a negative electrode 20 of the secondary battery according to the present invention comprises a support member 22. The support member 22 is preferably in the form of a perforated steel plate, and is coated with nickel. Reference numeral 24 is intended to illustrate an exemplary perforation in the plate 22.

A slurry of an electrolytically active substance is applied to both opposing surfaces of the support member 22 to form active substance layers 26. A supplementary support 28 is embedded in the active substance layer 26 of one side of the support member 22 just beneath the layer surface. The active substance layers applied to both surfaces of the support member are subjected to a drying process.

It is desired that the supplementary support be formed from an electrically conductive material to improve the low conductivity of the electrically active substance. In a preferred embodiment, the supplementary support 28 is in the form of an electrically conductive network that is used to supplement the low electrical conductivity of the electrically active substance. Accordingly, the supplementary supports serves to improve the electrical conductivity of the negative electrode. The supplementary support also provides, to a lessor extent, additional structural support to the negative electrode construction.

Figure 4:
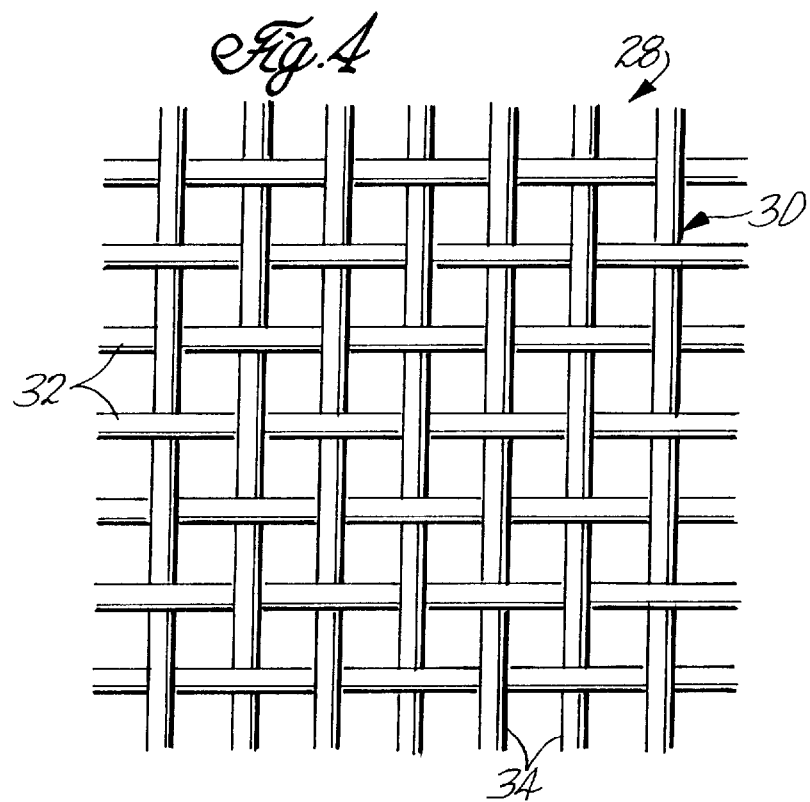
FIG. 4 is an elevational top plan view of a supplementary support used in the negative electrode of FIG. 3.
Figure 5:
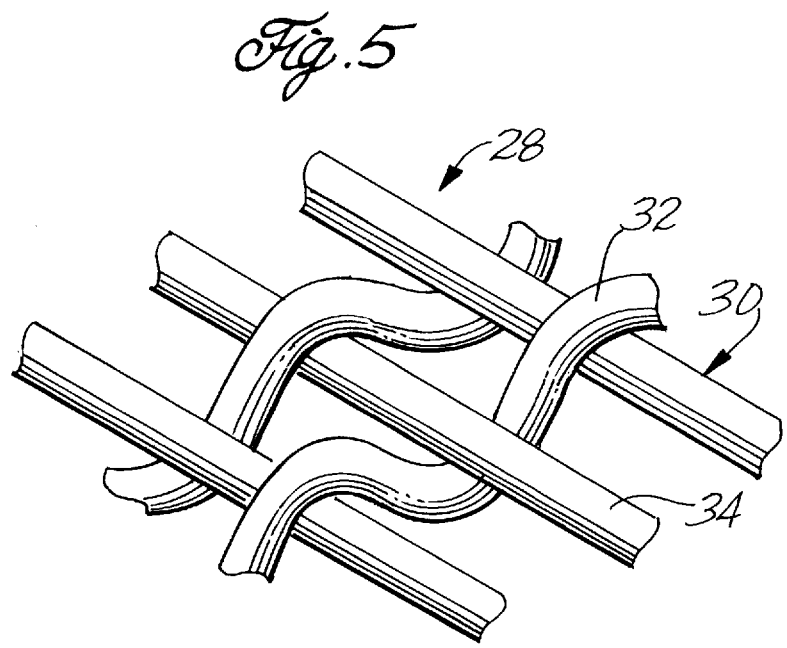
FIG. 5 is a perspective view of the supplementary support of FIG. 4.

Referring to FIG. 4, a preferred embodiment of the supplementary support has a two dimensional network formed from a plurality of electrically conductive members 30, e.g., wires, that are arranged in a matrix form. Row wires 32 forming the network are arranged parallel to each other, and column wires 34 forming the network are arranged parallel to each other and perpendicular to the row wires. Referring to FIG. 5, the row and column wires are entangled with and interconnect with one another.

The wires used to form the electrically conductive network occupy less that about three percent of the total area of the electrically conductive network. The construction of a supplementary support in the form of an electrically conductive network having such a low wire area occupance to total network area is advantageous because it does not appreciably decrease the density of the active substance forming the active substance layer 26.

In a preferred embodiment, the conductive wire used to form the network of the supplementary support has a diameter of less than about 0.5 millimeters (mm). If the diameter of the wire is greater than about 0.5 mm, the distance between the wires becomes larger since the area occupied by the conductive wires is limited, causing the improvement in the conductivity of the negative electrode to be reduced.

The electrical conductivity of the electrically active substance increases, and the rate of the active substance being detached decreases, as the mesh size of the network forming the supplementary support decreases. However, decreasing network mesh size also decreases the storage capacity per unit volume of the negative electrode assembly.

The nickel metal hydride secondary battery, constructed according to principles of this invention, has an improved discharging characteristic 36 as shown in FIG. 5, compared to the discharge characteristic 38 of conventional secondary battery constructions, so that the cycle of recharging and discharging is improved by about eight percent.

Although the supplementary support has been described and illustrated as being embedded in one layer of the active substance, i.e., on one side of the negative electrode, it is to be understood that a negative electrode constructed according to principles of this invention can have supplementary supports disposed on both sides. It is also understood that, although the negative electrode construction of this invention has been discribed in the context of a nickel metal hydride secondary battery, that the negative electrode construction can be used with batteries other than that specifically discribed.

An exemplary negative electrode was prepared according to this invention in the following manner. $MnNi_{3.75}Mn_{0.4}Al_{0.3}Co_{0.75}$ 90 parts, styrene butadiene rubber two parts, carbon eight parts and methyl cellulose 0.1 parts were added to pure water and were mixed at atmospheric conditions for one hour to form a mixture having a viscosity of approximately 100,000 centipoise. The mixture was coated, at a thickness of approximately 0.8 mm, to a nickel coated perforated steel plate. The plate was dried at a temperature of approximately 80 C for five minutes to remove a predetermined amount of water. A supplementary support was mounted on the coated plate and the mixture was coated onto the assembly. The resulting thickness of the coated mixture was approximately 1.2 mm. The negative electrode was formed from $Ni(OH)_2$, and the electrolyte was made of 7N KOH and 1N $LiOH*H_2O$. The capacity of the secondary battery formed therefrom was 1,400 mAh.

A comparative example was prepared according to the conventional art, i.e., without the supplementary support, in the following manner. $MnNi_{3.75}Mn_{0.4}Al_{0.3}Co_{0.75}$ 90 parts, styrene butadiene rubber two parts, carbon eight parts and methyl cellulose 0.1 parts were added to pure water and were mixed at atmospheric conditions for one hour to form a mixture having a viscosity of approximately 100,000 centipoise. The mixture was coated, at a thickness of approximately 0.8 mm, to a nickel coated perforated steel plate. The plate was dried at a temperature of approximately 80 C for five minutes to remove a predetermined amount of water. The negative electrode was formed from $Ni(OH)_2$, and the electrolyte was made of 7N KOH and 1N $LiOH*H_2O$. The capacity of the secondary battery formed therefrom was 1,400 mAh.

The secondary batteries prepared using the negative electrodes described above were each charged at a rate of approximately 420 mAh for four hours, and were allowed to rest for an hour. The batteries were each discharged under a discharge condition of 700 mAh and 0.9V. The batteries were repeatedly charged and discharged under these conditions to generate a capacity v. cycle life profile for each battery, as shown in FIG. 7. The secondary battery constructed according to principles of this invention was discovered to have a longer cycle life and improved discharge characteristic when compared to conventionally constructed secondary batteries.

Furthermore, the inventive electrode assembly may be installed in the protective can without using tabs, thus improving the efficiency. Thus, the present invention secures a high yield rate in fabrication of secondary batteries.

What is claimed is:

1. A secondary battery comprising:
   a cylindrically wound laminate comprising:
      a positive electrode plate, a negative electrode plate and a separator plate interposed therebetween;
   a protective can for enclosing said cylindrically wound laminate; and an electrolyte;

wherein said negative electrode plate comprises:

a perforated steel plate;

an electrolytically active substance disposed on at least one surface of the steel plate to form an active substance layer; and a supplementary support embedded in the active substance layer to a position beneath a surface of the active layer, the supplementary support comprising a conductive network formed from a plurality of interconnecting electrically conductive members.

2. The secondary battery as recited in claim 1 wherein the electrolytically active substance is a hydrogen retaining alloy.

3. The secondary battery as recited in claim 1, wherein the electrolytically active substance is $Ni(OH)_2$.

4. The secondary battery as recited in claim 2, wherein the electrolytically active substance is $Ni(OH)_2$.

5. The secondary battery as recited in claim 1 wherein the supplementary support comprises a matrix arrangement of electrically conductive wires, wherein the wires each have a diameter of less than about 0.5 millimeters.

6. A negative electrode for use in a cylindrically wound secondary battery comprising:

a support member formed from an electrically conductive material;

a layer of electrolytically active material disposed on at least one surface of the support member; and a supplementary support embedded in the electrolytically active material layer beneath the surface of the active material layer, wherein the supplementary support comprises a plurality of electrically conductive members that are entangled with one another to form an interconnected electrically conductive network.

7. The negative electrode as recited in claim 6 wherein the electrically conductive members are wires that are arranged in a matrix, wherein the wires each have a diameter of less than about 0.5 millimeters.

8. The negative electrode as recited in claim 7 wherein the wires used to form the electrically conductive network occupy less than about three percent of the total area of the electrically conductive network.

9. The negative electrode as recited in claim 7 wherein the support member is a perforated steel plate.

* * * * *

UNITED STATES PATENT AND TRADEMARK OFFICE
CERTIFICATE OF CORRECTION

PATENT NO. : 5,837,396
DATED : November 17, 1998
INVENTOR(S) : Kyeng-Ho Han

It is certified that error appears in the above-identified patent and that said Letters Patent is hereby corrected as shown below:

Column 1, line 22, before "a small" insert -- have --.
Column 1, line 66, change "dues" to -- due --.
Column 2, line 1, after "substance to" insert -- be --.
Column 3, line 27, change "serves" to -- serve --.
Column 3, line 30, change "lessor" to -- lesser --.
Column 3, line 42, change "that" to -- than --.
Column 4, lines 21,39, change "80 C" to -- 80°C -- (both occurrences).

Signed and Sealed this

Eleventh Day of July, 2000

Attest:

Q. TODD DICKINSON

*Attesting Officer*     *Director of Patents and Trademarks*